(12) United States Patent
Yan

(10) Patent No.: US 10,993,063 B2
(45) Date of Patent: Apr. 27, 2021

(54) METHOD FOR PROCESSING 3D AUDIO EFFECT AND RELATED PRODUCTS

(71) Applicant: Guangdong Oppo Mobile Telecommunications Corp., Ltd., Guangdong (CN)

(72) Inventor: Fenggui Yan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/569,053

(22) Filed: Sep. 12, 2019

(65) Prior Publication Data

US 2020/0100044 A1 Mar. 26, 2020

(30) Foreign Application Priority Data

Sep. 25, 2018 (CN) .......................... 201811115240.0

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 7/304* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11; H04S 2420/01
See application file for complete search history.

(56) References Cited

U.S. PATENT DOCUMENTS

| 6,072,878 A * | 6/2000 | Moorer | ................... H04S 5/005 381/17 |
| 10,225,656 B1 * | 3/2019 | Kratz | .................... G06T 13/205 |

(Continued)

FOREIGN PATENT DOCUMENTS

| CN | 1713784 A | 12/2005 |
| CN | 103024634 A | 4/2013 |

(Continued)

OTHER PUBLICATIONS

International search report issued in corresponding international application No. PCT/CN209/100252 dated Oct. 28, 2019.

(Continued)

*Primary Examiner* — Disler Paul

(57) ABSTRACT

A method for processing a 3D audio effect and related products are provided. The method includes the following. In a VR scenario, eight first positions of eight monaural sound sources and eight pieces of monaural data corresponding to the eight monaural sound sources are obtained, where the eight monaural sound sources correspond to a target object, and each eight monaural sound source locates at a position with unique 3D coordinates. A second position of a target object in the VR scenario is obtained, where the second position has 3D coordinates, and the eight first positions and the second position are based on the same coordinate origin. A distance between each of the eight first positions and the second position is determined to obtain eight distances. The eight pieces of monaural data are adjusted according to the eight distances. The eight pieces of monaural data adjusted are synthesized to 7.1-channel data.

18 Claims, 7 Drawing Sheets

(56) References Cited

U.S. PATENT DOCUMENTS

| | | | |
|---|---|---|---|
| 2007/0025703 A1 | 2/2007 | Horie | |
| 2011/0116665 A1 | 5/2011 | King et al. | |
| 2013/0182858 A1 | 7/2013 | You et al. | |
| 2015/0302665 A1 | 10/2015 | Miller | |
| 2016/0227338 A1* | 8/2016 | Oh | H04S 7/303 |
| 2019/0166448 A1* | 5/2019 | Laaksonen | G06F 3/167 |
| 2020/0160600 A1* | 5/2020 | Leppanen | G06F 3/16 |

FOREIGN PATENT DOCUMENTS

| | | |
|---|---|---|
| CN | 103096134 A | 5/2013 |
| CN | 108205409 A | 6/2013 |
| CN | 103686544 A | 3/2014 |
| CN | 105879390 A | 8/2016 |
| CN | 205566613 U | 9/2016 |
| CN | 105872940 B | 11/2017 |
| CN | 107360494 A | 11/2017 |
| CN | 207266264 U | 4/2018 |
| CN | 108465241 A | 8/2018 |
| EP | 2891955 A1 | 7/2015 |

OTHER PUBLICATIONS

European Search Report issued in corresponding European Application No. 19194568.2 dated Feb. 13, 2020.

Examination report issued in corresponding European application No. 19194568.2 dated Aug. 13, 2020.

The second OA and English Translation issued in corresponding CN application No. 201811115240.0 dated Aug. 21, 2020.

Examination report issued in corresponding IN application No. 201914036393 dated Nov. 24, 2020.

Modern vegetable seedling technology, Xuanjie Shi et al., p. 55, Zhongyuan Farmer Press, Oct. 31, 2013.

Decision for rejection with English Translation issued in corresponding CN application No. 201811115240.0 dated Jan. 27, 2021.

* cited by examiner

METHOD FOR PROCESSING 3D AUDIO EFFECT AND RELATED PRODUCTS

CROSS-REFERENCE TO RELATED APPLICATION(S)

This application claims priority to Chinese Patent Application Serial No. 201811115240.0, filed on Sep. 25, 2018, the entire disclosure of which is hereby incorporated by reference.

TECHNICAL FIELD

This disclosure relates to the technical field of virtual reality (VR) and augmented reality (AR), and more particularly to a method for processing a three dimensions (3D) audio effect and related products.

BACKGROUND

With popularity of electronic devices such as mobile phones, tablets, etc., the electronic devices can support an increasing number of applications and have powerful functions. The electronic devices are developing in a diversified and personalized way, becoming indispensable electronic products in daily life.

With technology development, VR is widely used in the electronic devices. However, for VR products, audio data received by existing headphones is usually two dimensions (2D) audio data. Accordingly, reality of sounds cannot be provided for users, thereby affecting user experience.

SUMMARY

Implementations of the present disclosure provide a method for processing a 3D audio effect and related devices.

According to a first aspect of the present disclosure, a method for processing a 3D audio effect is provided. The method includes the following. In a VR scenario, eight first positions of eight monaural sound sources and eight pieces of monaural data corresponding to the eight monaural sound sources are obtained, where the eight monaural sound sources correspond to a target object, the eight monaural sound sources are in a one-to-one correspondence relation with the eight pieces of monaural data, and each of the eight monaural sound sources locates at a position with unique 3D coordinates. A second position of the target object in the VR scenario is obtained, where the second position has 3D coordinates, and the eight first positions and the second position are based on the same coordinate origin. A distance between each of the eight first positions and the second position is determined to obtain eight distances. The eight pieces of monaural data are adjusted according to the eight distances. The eight pieces of monaural data adjusted are synthesized to 7.1-channel data.

According to a second aspect of the present disclosure, an electronic device is provided. The electronic device includes a processor, a memory, and one or more programs. The one or more programs are stored in the memory and configured to be executed by the processor. The one or more programs include instructions operable to execute operations described in the first aspect of the present disclosure.

According to a third aspect of the present disclosure, a computer readable storage medium is provided. The computer readable storage medium is configured to store computer programs. The computer programs, are operable with a processor to perform the following. In a VR scenario, a distance between each of a plurality of monaural sound sources and a target object is obtained. According to the distance between each of the plurality of monaural sound sources and the target object, a plurality of pieces of monaural data from the plurality of monaural sound sources are divided into a first group of monaural data and a second group of monaural data. The first group of monaural data with a first strategy to obtain a first target group of monaural data. The second group of monaural data with a second strategy to obtain a second target group of monaural data. The first target group of monaural data and the second target group of monaural data are synthesized.

BRIEF DESCRIPTION OF THE DRAWINGS

In order to describe technical solutions of implementations of the present disclosure or the related art more clearly, the following will give a brief description of accompanying drawings used for describing the implementations of the present disclosure or the related art. Apparently, accompanying drawings described below are merely some implementations of the present disclosure. Those of ordinary skill in the art can also obtain other accompanying drawings based on the accompanying drawings described below without creative efforts.

DETAILED DESCRIPTION

Figure 1:
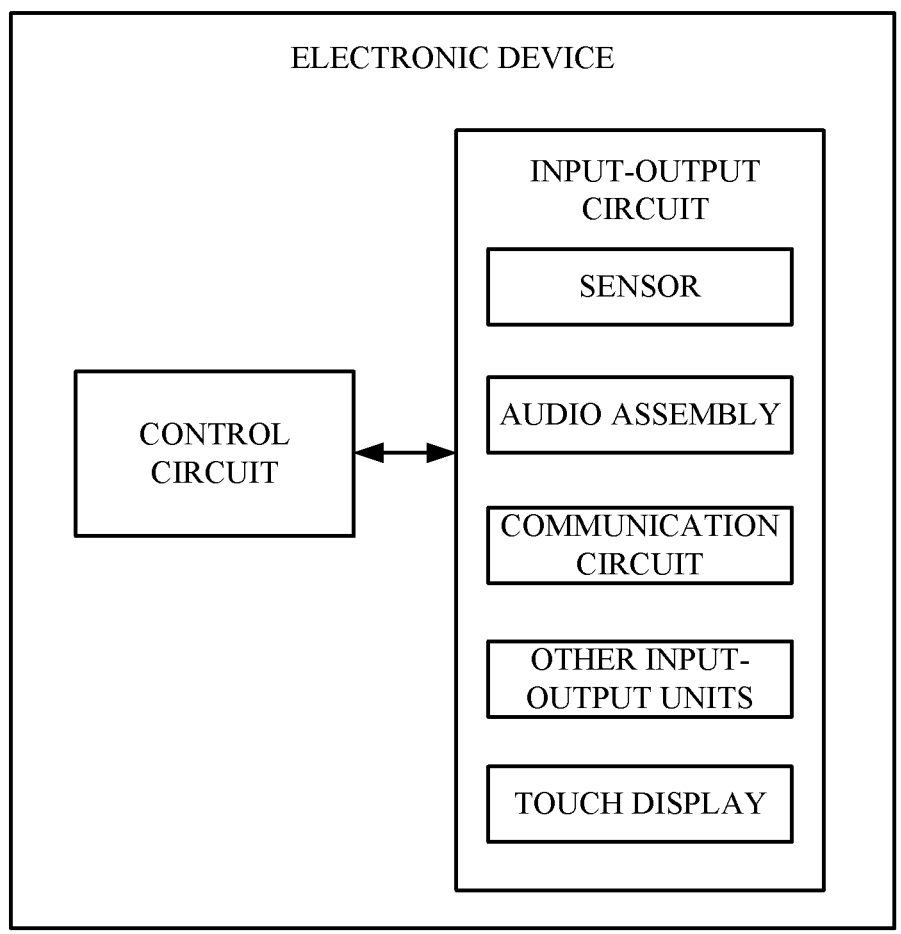
FIG. 1 is a block diagram illustrating an electronic device according to an implementation of the present disclosure.

In order for those skilled in the art to better understand technical solutions of the present disclosure, the technical solutions of implementations of the present disclosure will be described clearly and completely with reference to accompanying drawings in the implementations of the present disclosure. Apparently, implementations described hereinafter are merely some implementations, rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or device including a series of steps or units is not limited to the listed steps or units; on the contrary, it can optionally include other steps or units that are not listed; alternatively, other steps or units inherent to the process, method, product, or device can be included either.

"Implementation" mentioned in the present disclosure means that specific characteristics, structures, or properties described in connection with an implementation may be included in at least one implementation of the present disclosure. This word appears at each position of the specification does not refer to the same implementation as well as an independent or alternate implementation mutually exclusive to other implementations. It may be explicitly and implicitly understood by those skilled in the art that the implementations described in the present disclosure may be combined with the other implementations.

Electronic devices described in the implementations of the present disclosure may include handheld devices such as smart phones, on-board devices, VR and AR devices, wearable devices and computing devices that have various wireless communication functions, or other processing devices connected to a wireless modem, as well as various forms of user equipment (UE), mobile stations (MS), terminal devices, development/test platforms, servers, etc. For convenience of description, the above-mentioned devices are collectively referred to as electronic devices.

In the implementations of the present disclosure, in actual application, the electronic device can filter audio data (i.e., sounds from sound sources) with a head related transfer function (HRTF) filter to obtain virtual surround sound which is also referred to as surround sound or Atmos, thereby realizing a 3D audio effect. The HRTF is also referred to as head related impulse response (HRIR) in time domain. Alternatively, the audio data and the binaural room impulse response (BRIR) are subjected to a convolution processing. The BRIR is consisted of direct sound, early reflected sound, and reverberation.

The following will illustrate the implementations of the present disclosure in detail.

FIG. 1 is a block diagram illustrating an electronic device according to an implementation of the present disclosure. The electronic device includes a control circuit and an input-output circuit. The input-output circuit is coupled with the control circuit.

The control circuit may include a storage-processing circuit. A storage circuit of the storage-processing circuit may be a memory, such as a hard drive memory, a non-transitory memory (such as a flash memory, other electronically programmable read-only memories used to form a solid-state drive, or the like), a transitory memory (such as a static random access memory, a dynamic random access memory, or the like), or the like, and the implementation of the present disclosure is not limited thereto. A processing circuit of the storage-processing circuit is configured to control operations of the electronic device. The processing circuit can be implemented based on one or more microprocessors, microcontrollers, digital signal processors, baseband processors, power management units, audio codec chips, application-specific integrated circuits, display driver integrated circuits, and the like.

The storage-and-processing circuit can be configured to run software of the electronic device, such as an application for playing an incoming-call prompting ringing, an application for playing a short-message prompting ringing, an application for playing an alarm-clocking ringing, an application for playing a media file, a voice over Internet protocol (VOIP) phone call application, an operating system function, and the like. The software may be used to perform some control operations, such as playing an incoming call alert ring, playing a short message alert ring, playing an alarm alert ring, playing a media file, making a voice call, and other functions of the electronic device, and the implementation of the present disclosure is not limited thereto.

The input-output circuit can be configured to achieve data input and data output of the electronic device, that is, to allow the electronic device to receive data from an external device and to allow the electronic device to output data to an external device.

The input-output circuit may further include a sensor. The sensor may include an ambient light sensor, an optical or capacitive infrared proximity sensor, an ultrasonic sensor, a touch sensor (e.g., based on an optical touch sensor and/or a capacitive touch sensor, where the touch sensor may be part of a touch display screen or may be used independently as a touch sensor structure), an acceleration sensor, a gravity sensor, and other sensors. The input-output circuit may further include an audio assembly. The audio assembly may be configured to provide the electronic device with audio input and output functions. The audio assembly may include a tone generator, and other assemblies for generating and detecting sound.

The input-output circuit may further include one or more display screens. The display screen may be one or more of a liquid crystal display, an organic light emitting diode display, an electronic ink display, a plasma display, and display screens based on other display technologies. The display screen may include an array of touch sensors (i.e., the display screen may be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and the implementation of the present disclosure is not particularly restricted.

The input-output circuit may further include a communication circuit. The communication circuit is configured to provide the electronic device with a capability for communication with external devices. The communication circuit may include an analog/digital input-output interface circuit, and a wireless communication circuit based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. For example, the communication circuit may further include an NFC antenna and an NFC transceiver. For example, the communication circuit may further include a transceiver and an antenna for a cellular telephone, a transceiver circuit and an antenna for wireless local area network, and the like.

The input-output circuit may further include other input-output units. The other input-output units include but are not limited to a button, a joystick, a click wheel, a scroll wheel, a touch pad, a keypad, a keyboard, a camera, a light-emitting diode, and other status indicator.

The electronic device may further include a battery (not illustrated) for supplying power to the electronic device.

Hereinafter, the implementations of the disclosure will be described in detail.

According to a first aspect of the present disclosure, a method for processing a 3D audio effect is provided. The method includes the following. In a VR scenario, eight first positions of eight monaural sound sources and eight pieces of monaural data corresponding to the eight monaural sound sources are obtained, where the eight monaural sound sources correspond to a target object, the eight monaural sound sources are in a one-to-one correspondence relation with the eight pieces of monaural data, and each of the eight monaural sound sources locates at a position with unique 3D coordinates. A second position of the target object in the VR scenario is obtained, where the second position has 3D coordinates, and the eight first positions and the second position are based on the same coordinate origin. A distance between each of the eight first positions and the second position is determined to obtain eight distances. The eight pieces of monaural data are adjusted according to the eight distances. The eight pieces of monaural data adjusted are synthesized to 7.1-channel data.

Figure 2:
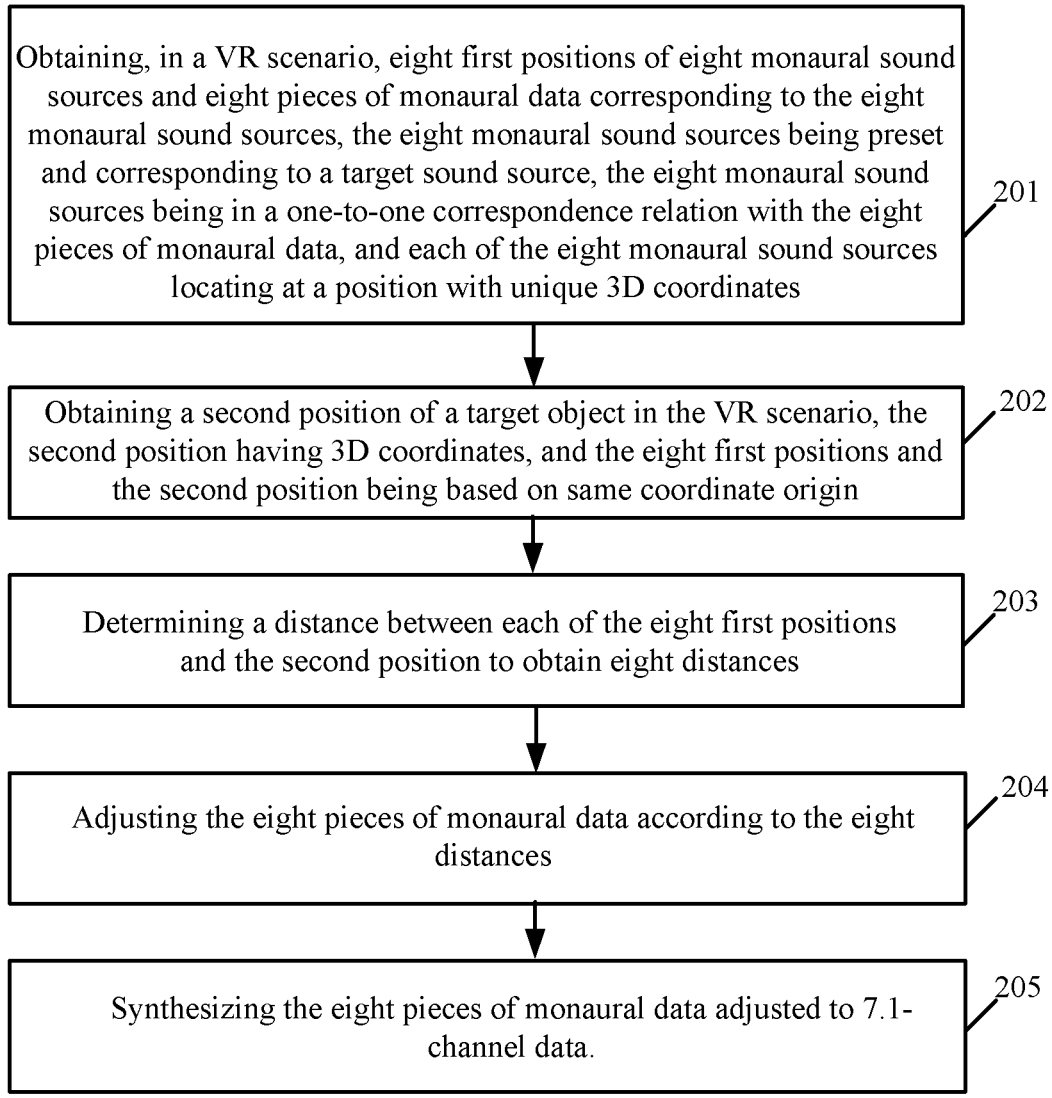
FIG. 2 is a flow chart illustrating a method for processing a 3D audio effect according to an implementation of the present disclosure.
Figure 3:
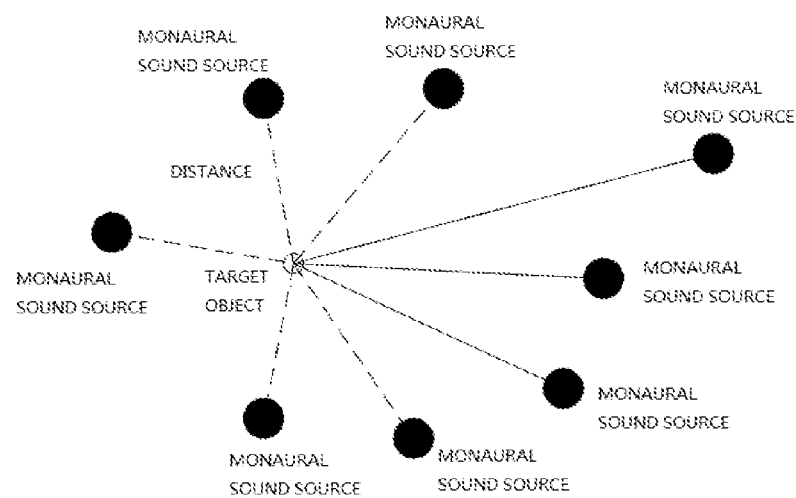
FIG. 3 is a schematic view illustrating a scenario for a method for processing a 3D audio effect according to an implementation of the present disclosure.

FIG. 2 is a flow chart illustrating a method for processing a 3D audio effect according to an implementation of the present disclosure. The method is applied to the electronic device illustrated in FIG. 1. The method for processing a 3D audio effect includes operations at blocks 201 to 203.

At block 201, in a VR scenario, eight first positions of eight monaural sound sources and eight pieces of monaural data corresponding to the eight monaural sound sources are obtained, where the eight monaural sound sources are preset and correspond to a target object, the eight monaural sound sources are in a one-to-one correspondence relation with the eight pieces of monaural data, and each of the eight monaural sound sources locates at a position with unique 3D coordinates.

The implementation of the present disclosure is applied to the VR scenario, for example, a VR game. In actual implementation, in the VR scenario, the target sound source can correspond to the eight monaural sound sources preset, that is, audio data from the target sound source is transmitted via the eight monaural sound sources, where each monaural sound source can transmit same audio data. Each monaural sound source corresponds to one first position. Certainly, each monaural sound source locates at a position having 3D coordinates. Each monaural sound source corresponds to one piece of monaural data. Each piece of monaural data is a piece of monaural audio data. For example, the electronic device can obtain, in the VR scenario, the eight first positions of the eight monaural sound sources that are preset and correspond to the target sound source, where the eight monaural sound sources locate at different positions.

At block 202, a second position of the target object in the virtual reality scenario is obtained, where the second position has 3D coordinates, and the eight first positions and the second position are based on the same coordinate origin.

The target object may be a game role, a user, or other preset object, and the present disclosure is not limited thereto. The electronic device can obtain the second position of the target object in the VR scenario, where the second position has the 3D coordinates, and the eight first positions and the second position are based on the same coordinate origin, that is, in the implementation of the present disclosure, for the VR scenario, only one coordinate origin exists.

For example, when the target object is in a game scenario, at block 202, the second position of the target object in the VR scenario is obtained as follows. 21, a map corresponding to the game scenario is obtained. 22, a coordinate position of the target object in the map is determined to obtain the second position.

When the target object is in the game scenario, the target object may be a game role. Certainly, in actual implementation, the game scenario can correspond to a 3D map. Thus, the electronic device can obtain a map corresponding to the game scenario, and determine the coordinate position of the target object in the map to obtain a 3D position. In this manner, for different games, a position of a role can be determined in real time. In the implementation of the present disclosure, for the specific position of the role, 3D audio effects can be generated. Thus, when playing the game, an immersive experience can be provided for the user, and thus the user may feel that the game world is vivid.

At block 203, a distance between each of the eight first positions and the second position is determined to obtain eight distances.

The electronic device can determine the distance between each of the eight first positions and the second position to obtain the eight distances. Since each first position has 3D coordinates, each second position has 3D coordinates, for example, the 3D coordinates of one first position is (x1, y1, z1), and the 3D coordinates of the second position is (x2, y2, z2), then the distance between the first position and the second position can be calculated according to the 3D coordinates of the first position and the 3D coordinates of the second position. The eight monaural sound sources corresponding to the target sound source are illustrated in FIG. 1C. There is a distance between the target object and each monaural sound source (as illustrated by a dotted line), and thus the eight distances can be obtained.

For example, at block 203, the distance between each of the eight first positions and the second position is determined as follows. 31, a first pixel position corresponding to a first position i is obtained, where the first position i is any one of the eight first positions. 32, a second pixel position corresponding to the second position is obtained. 33, a target pixel difference between the first pixel position and the second pixel position is determined. 34, according to a predetermined mapping relation between distances and pixel differences, a target distance corresponding to the target pixel difference is determined, where the target distance is a distance between the first position i and the second position.

The first position i is any one of the eight first positions. The electronic device can obtain the first pixel position of the first position i, obtain the second pixel position of the second position, and determine the target pixel difference between the first pixel position and the second pixel position. The target pixel difference be understood to be the number of pixels between the first pixel position and the second pixel position. If the target pixel difference is 1, it indicates that the first pixel position is adjacent to the second pixel position. A mapping relation between distances and pixel differences can be stored in the electronic in advance. Thus, according to the mapping relation, the target distance corresponding to the target pixel difference can be determined, where the target distance is the distance between the first position i and the second position.

At block 204, the eight pieces of monaural data are adjusted according to the eight distances.

The electronic device can adjust the eight pieces of monaural data according to the eight distances. The adjustment manner may be at least one of the following: audio effect enhancement, audio effect reduction, audio effect maintaining, and the like, and the present disclosure is not limited thereto. The audio effect enhancement may be at least one of the following: volume increment, current increment, voltage increment, power increment, and the like, and the present disclosure is not limited thereto. The audio effect reduction may be at least one of the following: volume reduction, current reduction, voltage reduction, power reduction, filtering, peaking clipping, and the like, and the present disclosure is not limited thereto. The audio effect maintaining is that no processing is performed.

For example, at block 204, the eight pieces of monaural data are adjusted according to the eight distances as follows. 41, each distance smaller than a preset threshold is selected from the eight distances to obtain at least target distance. 42, at least one piece of monaural data corresponding to the at least one target distance is determined as a first monaural-data set. 43, among the eight pieces of monaural data, at least one piece of monaural data that fails to be contained in the first monaural-data set is determined as a second monaural-data set. 44, a first processing is performed on the first monaural-data set to obtain a first target monaural-data set. 45, a second processing is performed on the second monaural-data set to obtain a second target monaural-data set.

The preset threshold mentioned above may be set by the user or may be system default. The preset threshold may be a dynamical threshold, for example, the preset threshold may be an average value of the eight distances, a minimum value among the eight distances, a second minimum value among the eight distances, or the like, and the present disclosure is not limited thereto. For example, the electronic device can select the at least one distance smaller than the preset threshold from the eight distances to obtain the at least one target distance. The at least one piece of monaural data corresponding to the at least one target distance is determined as the first monaural-data set, and among the eight pieces of monaural data, the at least one piece of monaural data that fails to be contained in the first monaural-data set is determined as the second monaural-data set. The first processing is performed on the first monaural-data set to obtain the first target monaural-data set. The first processing may be audio effect enhancement or audio effect maintaining. The second processing is performed on the second monaural-data set to obtain the second target monaural-data set. The second processing may be audio effect reduction or audio effect maintaining. In this way, audio effects of a monaural sound source close to the target object can be enhanced, and audio effects of a monaural sound source away from the target object can be reduced, and thus feeling of space is real.

For example, at block 44, the first processing is performed on the first monaural-data set to obtain the first target monaural-data set as follows. An audio effect enhancement processing is performed on each piece of monaural data in the first monaural-data set to obtain the first target monaural-data set.

For example, at block 45, the second processing is performed on the second monaural-data set to obtain the second target monaural-data set as follows. An audio effect reduction processing is performed on at least one piece of monaural data in the second monaural-data set to obtain the second target monaural-data set.

The electronic device can perform the audio effect enhancement processing on each piece of monaural data in the first monaural-data set to obtain the first target monaural-data set. The audio effect enhancement may be at least one of the following: volume increment, current increment, voltage increment, power increment, and the like, and the present disclosure is not limited thereto. Correspondingly, the electronic device can perform the audio effect reduction processing on at least one piece of monaural data in the second monaural-data set to obtain the second target monaural-data set. The audio effect reduction may be at least one of the following: volume reduction, current reduction, voltage reduction, power reduction, filtering, peaking clipping, and the like.

For example, at block 45, the audio effect reduction processing is performed on the at least one piece of monaural data in the second monaural-data set as follows. 451, at least one distance is obtained, where each of the at least one distance corresponds to one piece of monaural data in the second monaural-data set. 452, according to a predetermined mapping relation between distances and audio effect reduction coefficients, at least one target audio effect reduction coefficient corresponding to the at least one distance is determined. 453, according to the at least one target audio effect reduction coefficient, the audio effect reduction processing is performed on the second monaural-data set.

The electronic device can obtain the at least one distance, where each of the at least one distance corresponds to one piece of monaural data in the second monaural-data set. The mapping relation between distances and audio reduction coefficients can be stored in the electronic device in advance. The electronic device can determine the at last one target audio effect reduction coefficient corresponding to the at least one distance according to the mapping relation. Furthermore, the electronic device can perform the audio effect reduction processing on a corresponding piece of monaural data in the second monaural-data set according to each target audio effect reduction coefficient, where each of the at least one target audio effect reduction coefficient corresponds to one piece of monaural data in the second monaural-data set. The target audio effect reduction coefficient may be a decimal or a negative number, where the decimal is selected from a range from 0 to 1. Taking volume of a certain piece of monaural data as an example, the volume can be reduced. If the present volume is A1, volume reduced is 0.8*A1.

For example, at block 44, the first processing is performed on the first monaural-data set to obtain the first target monaural-data set as follows. An audio effect maintaining processing is performed on at least one piece of monaural data in the first monaural-data set to obtain the first target monaural-data data set.

For example, at block 45, the second processing is performed on the second monaural-data set to obtain the second target monaural-data set as follows. The audio effect reduction processing is performed on at least one piece of monaural data in the second monaural-data set to obtain the second target monaural-data set.

The electronic device can perform the audio effect maintaining processing on at least one piece of monaural data in the first monaural-data set to obtain the first target monaural-data set. Correspondingly, the electronic device can perform the audio effect reduction processing on at least one piece of monaural data in the second monaural-data set to obtain the second target monaural-data set. The audio effect reduction may be at least one of the following: volume reduction, current reduction, voltage reduction, power reduction, filtering, peaking clipping, and the like, and the present disclosure is not limited thereto.

At block 205, the eight pieces of monaural data adjusted are synthesized to 7.1-channel data.

The electronic device can synthesize the eight pieces of monaural data adjusted to the 7.1-channel data. For example, the eight pieces of monaural data adjusted can be input to an HRTF model to obtain the 7.1-channel data.

For example, after the operation at block 205, the method further includes the following. A1, a target wallpaper corresponding to current environment is obtained. A2, according to a predetermined mapping relation between wallpapers and reverberation effect parameters, a target reverberation effect parameter corresponding to the target wallpaper is determined. A3, the 7.1-channel data is performed according to the target reverberation effect parameter to obtain reverberation 7.1-channel data.

The reverberation effect parameter may be at least one of the following: an input level, a low frequency tangent point, a high frequency tangent point, an early reflection time, a diffusion degree, a low mixing ratio, reverberation time, high damping, a crossover point, original dry sound volume, early reflected sound volume, reverberation volume, sound field width, output sound field, final sound, and the like, and the present disclosure is not limited thereto. The wallpaper can be understood to be background of the environment. The environment herein may be a game environment. Different environments correspond to different wallpapers. In the game scenario, the position of the target object can be determined, and then the target wallpaper corresponding to the position can be determined according to the map. If not in the game scenario, a current environment parameter can be detected by an environment sensor, and the current environment is determined according to the current environment parameter. The environment sensor may be at least one of the following: a humidity sensor, a temperature sensor, an ultrasonic sensor, a distance sensor, a camera, and the like, and the present disclosure is not limited thereto. The environment parameter may be at least one of the following: temperature, humidity, distance, image, and the like, and the present disclosure is not limited thereto. A mapping relation between environment parameters and environments can be stored in the electronic device in advance, and thus the electronic device can determine the current environment corresponding to the current environment parameter according to the mapping relation. A mapping relation between environments and wallpapers can be stored in the electronic device in advance, and thus the electronic device can determine the target wallpaper corresponding to the current environment according to the mapping relation. A mapping relation between wallpapers and reverberation effect parameters can be stored in the electronic device in advance, and thus the electronic device can determine the target reverberation effect parameter corresponding to the target wallpaper according to the mapping relation. The target 7.1-channel data is processed according to the target reverberation effect parameter to obtain the reverberation 7.1-channel data. For example, the target reverberation effect parameter can be input to the HRTF algorithm model to obtain the reverberation 7.1-channel data.

It can be seen that in the implementation of the present disclosure, for the method for processing the 3D audio effect, in the VR scenario, the eight first positions of the eight monaural sound sources and the eight pieces of monaural data corresponding to the eight monaural sound sources are obtained, where the eight monaural sound sources are preset and correspond to the target sound source, the eight monaural sound sources are in a one-to-one correspondence relation with the eight pieces of monaural data, and each of the eight monaural sound sources locates at a position with unique 3D coordinates. The second position of the target object in the VR scenario is obtained, where the second position has 3D coordinates, and the eight first positions and the second position are based on the same coordinate origin. The distance between each of the eight first positions and the second position is determined to obtain the eight distances. The eight pieces of monaural data are adjusted according to the eight distances. The eight pieces of monaural data adjusted are synthesized to the 7.1-channel data. The 7.1-channel data can be obtained according to the position in the VR scenario, and thus user experience is improved.

Figure 4:
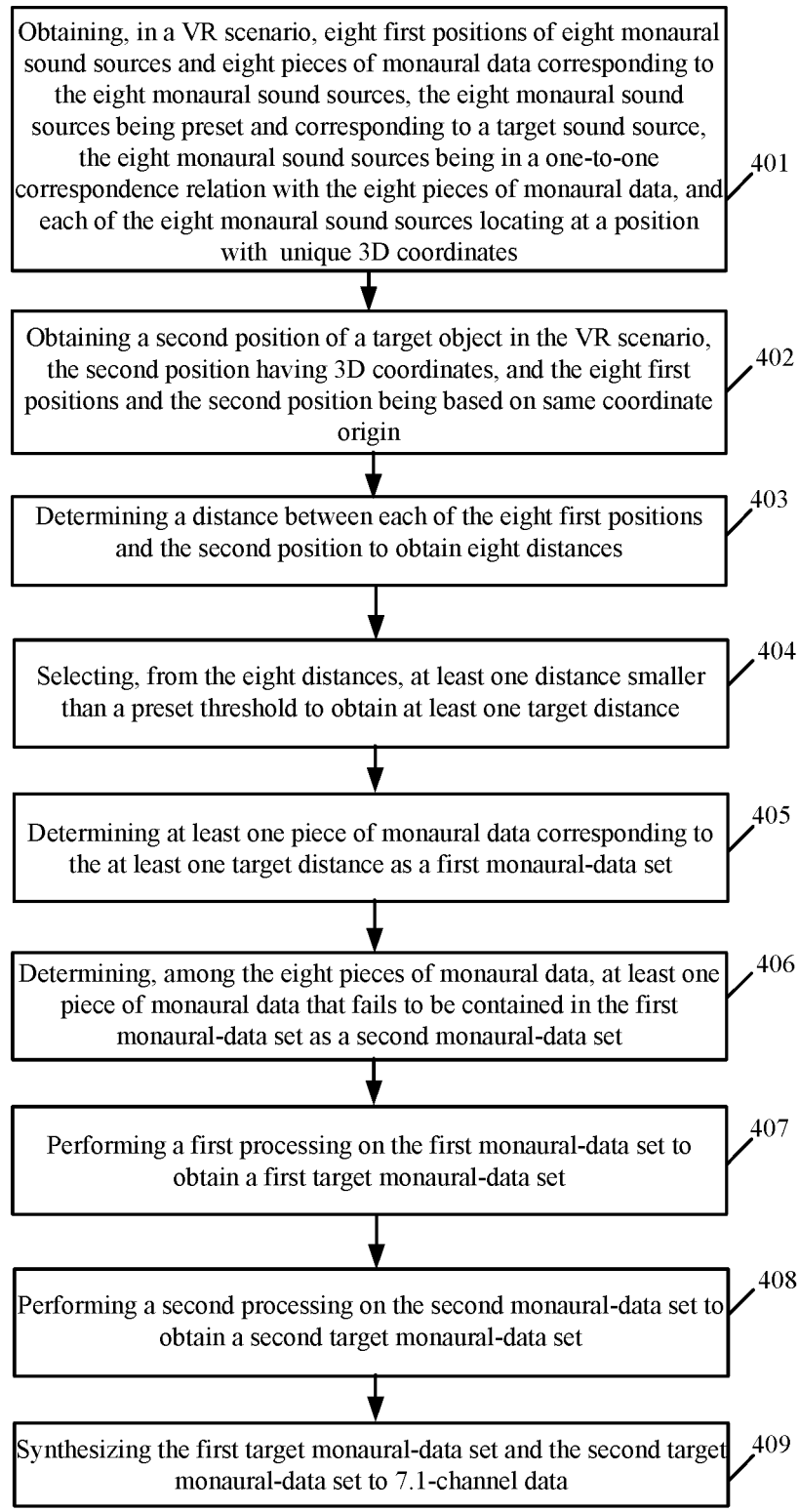
FIG. 4 is a flow chart illustrating a method for processing a 3D audio effect according to another implementation of the present disclosure.

In consistence with the above, FIG. 4 is a flow chart illustrating a method for processing a 3D audio effect according to an implementation of the present disclosure. The method is applied to the electronic device illustrated in FIG. 1. The method for processing the 3D audio effect includes operations at blocks 401 to 409.

At block 401, in a VR scenario, eight first positions of eight monaural sound sources and eight pieces of monaural data corresponding to the eight monaural sound sources are obtained, where the eight monaural sound sources are preset and correspond to a target sound source, the eight monaural sound sources are in a one-to-one correspondence relation with the eight pieces of monaural data, and each of the eight monaural sound sources locates at a position with unique 3D coordinates.

At block 402, a second position of a target object in the virtual reality scenario is obtained, where the second position has 3D coordinates, and the eight first positions and the second position are based on same coordinate origin.

At block 403, a distance between each of the eight first positions and the second position is determined to obtain eight distances.

At block 404, at least one distance smaller than a preset threshold is selected from the eight distances to obtain at least one target distance.

At block 405, at least one piece of monaural data corresponding to the at least one target distance is determined as a first monaural-data set.

At block 406, among the eight pieces of monaural data, at least one piece of monaural data that fails to be contained in the first monaural-data set is determined as a second monaural-data set.

At block 407, a first processing is performed on the first monaural-data set to obtain a first target monaural-data set.

At block 408, a second processing is performed on the second monaural-data set to obtain a second target monaural-data set.

At block 409, the first target monaural-data set and the second target monaural-data set are synthesized to 7.1-channel data.

For detailed illustration of the operations at blocks 401 to 409, reference can be made to corresponding descriptions of the method for processing the 3D audio effect illustrated in FIG. 1, and details are not repeated herein.

It can be seen that in the implementation of the present disclosure, for the method for processing the 3D audio effect, in the VR scenario, the eight first positions of the eight monaural sound sources and the eight pieces of monaural data corresponding to the eight monaural sound sources are obtained, where the eight monaural sound sources are preset and correspond to a target sound source, the eight monaural sound sources are in a one-to-one correspondence relation with the eight pieces of monaural data, and each of the eight monaural sound sources locates at a position with unique 3D coordinates. The second position of the target object in the VR scenario is obtained, where the second position has 3D coordinates, and the eight first positions and the second position are based on the same coordinate origin. The distance between each of the eight first positions and the second position is determined to obtain the eight distances. The eight pieces of monaural data are adjusted according to the eight distances. The eight pieces of monaural data adjusted are synthesized to the 7.1-channel data. The 7.1-channel data can be obtained according to the position in the VR scenario, and thus user experience is improved.

Figure 5:
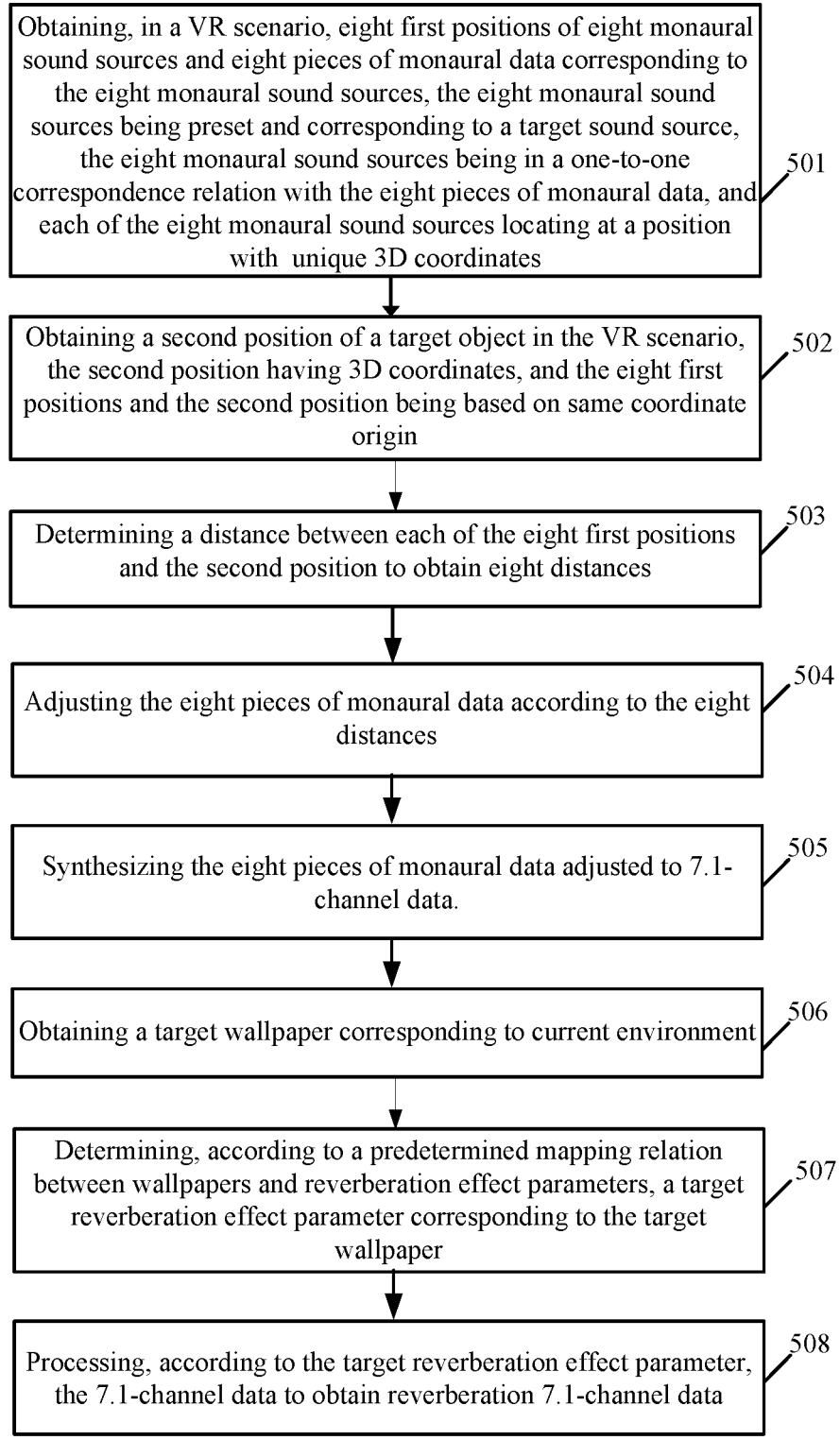
FIG. 5 is a flow chart illustrating a method for processing a 3D audio effect according to another implementation of the present disclosure.

In consistence with the above, FIG. 5 is a flow chart illustrating a method for processing a 3D audio effect according to an implementation of the present disclosure. The method is applied to the electronic device illustrated in FIG. 1. The method for processing the 3D audio effect includes operations at blocks 501 to 508.

At block 501, in a VR scenario, eight first positions of eight monaural sound sources and eight pieces of monaural data corresponding to the eight monaural sound sources are obtained, where the eight monaural sound sources are preset and correspond to a target sound source, the eight monaural sound sources are in a one-to-one correspondence relation with the eight pieces of monaural data, and each of the eight monaural sound sources locates at a position with unique 3D coordinates.

At block 502, a second position of a target object in the VR scenario is obtained, where the second position has 3D coordinates, and the eight first positions and the second position are based on same coordinate origin.

At block 503, a distance between each of the eight first positions and the second position is determined to obtain eight distances.

At block 504, the eight pieces of monaural data are adjusted according to the eight distances.

At block 505, the eight pieces of monaural data adjusted are synthesized to a 7.1-channel data.

At block 506, a target wallpaper corresponding to current environment is obtained.

At bock 507, according to a predetermined mapping relation between wallpapers and reverberation effect parameters, a target reverberation effect parameter corresponding to the target wallpaper is determined.

At block 508, according to the target reverberation effect parameter, the 7.1-channel data is processed to obtain reverberation 7.1-channel data.

For detailed illustration of the operations at blocks 501 to 508, reference can be made to corresponding descriptions of the method for processing the 3D audio effect illustrated in FIG. 1, and details are not repeated herein.

It can be seen that in the implementation of the present disclosure, for the method for processing the 3D audio effect, the first 3D coordinates of each sound source is obtained, the piece of monaural data generated by each sound source is obtained, and the second 3D coordinates of the target object is obtained. According to the first 3D coordinates, the second 3D coordinates, and each piece of monaural data, target double-track data can be generated. The target wallpaper corresponding to the current environment is obtained. According to the predetermined mapping relation between wallpapers and reverberation effect parameters, the target reverberation effect parameter corresponding to the target wallpaper is determined. According to the target reverberation effect parameter, the target double-track data is processed to obtain reverberation double-track data. In this way, upon determination of the first 3D coordinates of the sound source and the second 3D coordinates of the target object, the 3D audio effects can be generated. Furthermore, the double-track data having a reverberation effect can be generated. Thus, 3D audio effect feeling is vivid, and user experience is improved.

Figure 6:
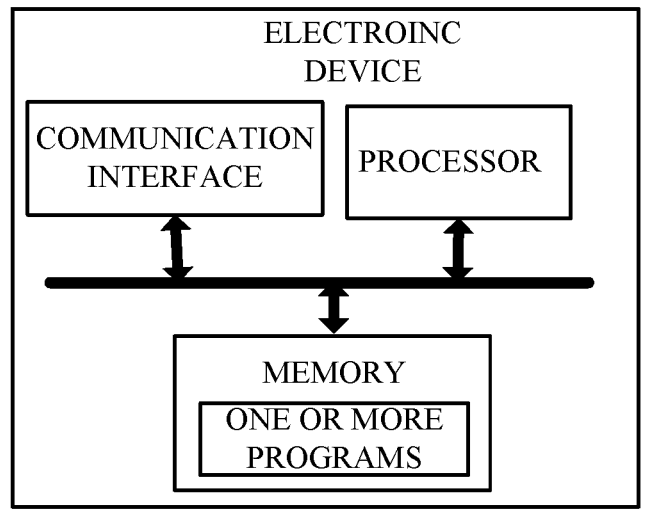
FIG. 6 is a block diagram illustrating an electronic device according to another implementation of the present disclosure.

FIG. 6 is a block diagram illustrating an electronic device according to another implementation of the present disclosure. As illustrated in FIG. 6, the electronic device includes a processor, a memory, a communication interface, and one or more programs. The one or more programs are stored in the memory and configured to be executed by the processor. The one or more programs include instructions operable to perform the following. In a VR scenario, eight first positions of eight monaural sound sources and eight pieces of monaural data corresponding to the eight monaural sound sources are obtained, where the eight monaural sound sources are preset and correspond to a target object, the eight monaural sound sources are in a one-to-one correspondence relation with the eight pieces of monaural data, and each of the eight monaural sound sources locates at a position with unique 3D coordinates. A second position of the target object in the VR scenario is obtained, where the second position has 3D coordinates, and the eight first positions and the second position are based on the same coordinate origin. A distance between each of the eight first positions and the second position is determined to obtain eight distances. The eight pieces of monaural data are adjusted according to the eight distances. The eight pieces of monaural data adjusted are synthesized to 7.1-channel data.

In a possible example, for adjusting the eight pieces of monaural data according to the eight distances, the one or more programs includes instructions for performing the following. At least one distance smaller than a preset threshold is selected from the eight distances to obtain at least one target distance. At least one piece of monaural data corresponding to the at least one target distance is determined as a first monaural-data set. Among the eight pieces of monaural data, at least one piece of monaural data that fails to be contained in the first monaural-data set is determined as a second monaural-data set. A first processing is performed on the first monaural-data set to obtain a first target monaural-data set. A second processing is performed on the second monaural-data set to obtain a second target monaural-data set.

In a possible example, for performing the first processing on the first monaural-data set to obtain the first target monaural-data set, the one or more programs include instruction for performing the following. An audio effect enhancement processing is performed on each piece of monaural data in the first monaural-data set to obtain the first target monaural-data data set.

The second processing is performed on the second monaural-data set to obtain the second target monaural-data set as follows. An audio effect reduction processing is performed on at least one piece of monaural data in the second monaural-data set to obtain the second target monaural-data set.

In a possible example, for performing the audio effect reduction processing on the at least one piece of monaural data in the second monaural-data set, the one or more programs include instructions for performing the following. At least one distance is determined, where each of the at least one distance corresponds to one piece of monaural data in the second monaural-data set. According to a predetermined mapping relation between distances and audio effect reduction coefficients, at least one target audio effect reduction coefficient corresponding to the at least one distance is determined. According to the at least one target audio effect reduction coefficient, the audio effect reduction processing is performed on the second monaural-data set.

In a possible example, for performing the first processing on the first monaural-data set to obtain the first target monaural-data set, the one or more programs include instructions for performing the following. An audio effect maintaining processing is performed on at least one piece of monaural-data in the first monaural-data set to obtain the first target monaural-data set.

The second processing is performed on the second monaural-data set to obtain the second target monaural-data set as follows. The audio effect reduction processing is performed on the at least one piece of monaural data in the second monaural-data set to obtain the second target monaural-data set.

In a possible example, for determining the distance between each of the eight first positions and the second position, the one or more programs include instructions for performing the following. A first pixel position corresponding to a first position i is obtained, where the first position i is one of the eight first positions. A second pixel position corresponding to the second position is obtained. A target pixel difference between the first pixel position and the second pixel position is determined. According to a predetermined mapping relation between distances and pixel differences, a target distance corresponding to the target pixel difference is determined, where the target distance is a distance between the first position i and the second position.

In a possible example, the one or more programs further include instructions for performing the following. A target wallpaper corresponding to current environment is obtained. According to a predetermined mapping relation between wallpapers and reverberation effect parameters, a target reverberation effect parameter corresponding to the target wallpaper is determined. According to the target reverberation effect parameter, the 7.1-channel data is processed to obtain reverberation 7.1-channel sound data.

The above illustrates the technical solutions of the implementations of the disclosure mainly from the execution of the methods. It can be understood that, in order to implement the above functions, the electronic device includes hardware structures and/or software modules for performing various functions. Those of ordinary skill in the art shall appreciate that units and algorithmic operations in various examples described in connection with the implementations herein can be implemented in hardware or a combination of computer software and hardware. Whether a certain function is implemented by means of hardware or computer software driving hardware depends on particular application and design constraints of the technical solutions. For a specific application, those skilled in the art may use different methods to implement the described functions, but such implementation should not be regarded as beyond the scope of the present disclosure.

In the implementations of the present disclosure, the electronic device can be divided into different functional units according to the above method implementations. For example, the electronic device can be divided into different functional units each corresponding to a function, or two or more functions may be integrated into one processing unit. The integrated unit can be implemented in the form of hardware or a software functional unit. It is to be noted that, unit division provided herein is illustrative and just a logical function division. In practice, there can be other division manners.

Figure 7:
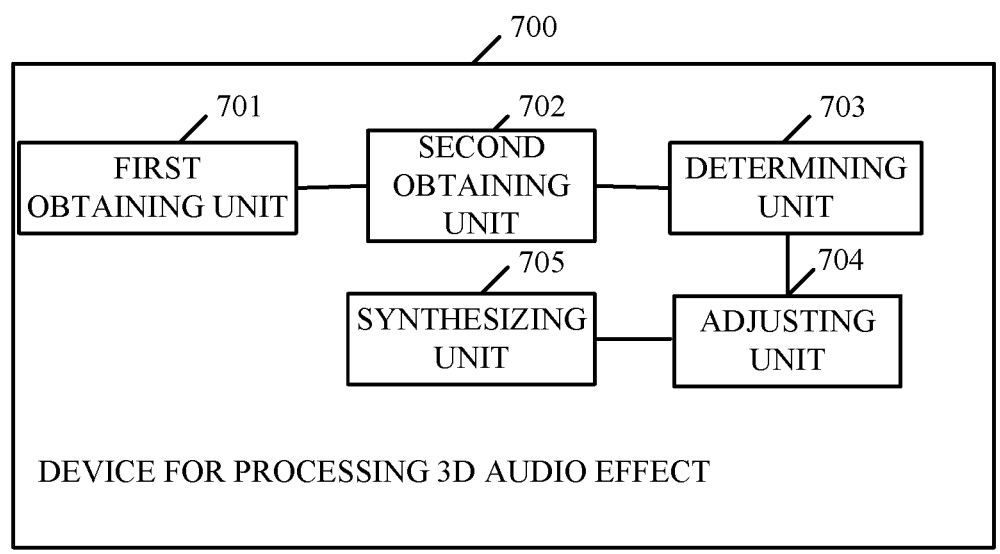
FIG. 7 is a block diagram illustrating a device for processing a 3D audio effect according to an implementation of the present disclosure.

FIG. 7 is a block diagram illustrating a method for processing a 3D audio effect according to an implementation of the present disclosure. The device is applied to the electronic device illustrated in FIG. 1. A device 700 for a 3D audio effect includes a first obtaining unit 701, a second obtaining unit 702, a determining unit 703, an adjusting unit 704, and a synthesizing unit 705.

The first obtaining unit 701 is configured to obtain, in a VR scenario, eight first positions of eight monaural sound sources and eight pieces of monaural data corresponding to the eight monaural sound sources, where the eight monaural sound sources are preset and correspond to a target sound source, the eight monaural sound sources are in a one-to-one correspondence relation with the eight pieces of monaural data, and each of the eight monaural sound sources locates at a position with unique 3D coordinates.

The second obtaining unit 702 is configured to obtain a second position of a target object in the VR scenario, where the second position has 3D coordinates, and the eight first positions and the second position are based on same coordinate origin.

The determining unit 703 is configured to determine a distance between each of the eight first positions and the second position to obtain eight distances.

The adjusting unit 704 is configured to adjust the eight pieces of monaural data according to the eight distances.

The synthesizing unit 705 is configured to synthesize the eight pieces of monaural data adjusted to 7.1-channel data.

In a possible example, the adjusting unit 704 configured to adjust the eight pieces of monaural data according to the eight distances is configured to select at least one distance smaller than a preset threshold from the eight distances to obtain at least one target distance, determine at least one piece of monaural data corresponding to the at least one target distance as a first monaural-data set, determine, among the eight pieces of monaural data, at least one piece of monaural data that fails to be contained in the first monaural-data set as a second monaural-data set, perform a first processing on the first monaural-data set to obtain a first target monaural-data set, and perform a second processing on the second monaural-data set to obtain a second target monaural-data set.

In a possible example, the adjusting unit 704 configured to perform the first processing on the first monaural-data set to obtain the first target monaural-data set is configured to perform an audio effect enhancement processing on each piece of monaural data in the first monaural-data set to obtain the first target monaural-data data set.

The second processing is performed on the second monaural-data set to obtain the second target monaural-data set as follows. An audio effect reduction processing is performed on at least one piece of monaural data in the second monaural-data set to obtain the second target monaural-data set.

In a possible example, the adjusting unit 704 configured to perform the audio effect reduction processing on the at least one piece of monaural data in the second monaural-data set is configured to perform the following. At least one distance is determined, where each of the at least one distance corresponds to one piece of monaural data in the second monaural-data data set. According to a predetermined mapping relation between distances and audio effect reduction coefficients, at least one target audio effect reduction coefficient corresponding to the at least one distance is determined. According to the at least one target audio effect reduction coefficient, the audio effect reduction processing is performed on the second monaural-data set.

In a possible example, the adjusting unit 704 configured to perform the first processing on the first monaural-data set to obtain the first target monaural-data set is configured to perform an audio effect maintaining processing on at least one piece of monaural-data in the first monaural-data set to obtain the first target monaural-data set.

The second processing is performed on the second monaural-data set to obtain the second target monaural-data set as follows. The audio effect reduction processing is performed on at least one piece of monaural data in the second monaural-data set to obtain the second target monaural-data set.

In a possible example, the determining unit 703 configured to determine the distance between each of the eight first positions and the second position is configured to perform the following. A first pixel position corresponding to a first position i is obtained, where the first position i is one of the eight first positions. A second pixel position corresponding to the second position is obtained. A target pixel difference between the first pixel position and the second pixel position is determined. According to a predetermined mapping relation between distances and pixel differences, a target distance corresponding to the target pixel difference is determined, where the target distance is a distance between the first position i and the second position.

Figure 8:
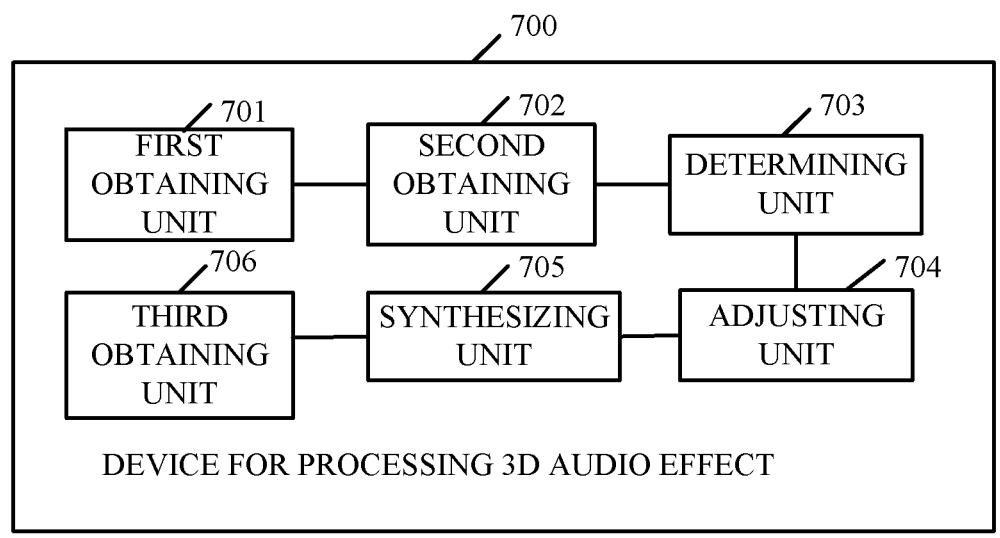
FIG. 8 is a block diagram illustrating a device for processing a 3D audio effect according to another implementation of the present disclosure.

In a possible example, FIG. 8 illustrates a device varied from the device for processing the 3D audio effect illustrated in FIG. 7. Compared with the device illustrated in FIG. 7, the device illustrated in FIG. 8 further includes a third obtaining unit 706 configured to obtain a target wallpaper corresponding to current environment.

The determining unit 703 is further configured to determine, according to a predetermined mapping relation between wallpapers and reverberation effect parameters, a target reverberation effect parameter corresponding to the target wallpaper.

The synthesizing unit 705 is configured to process, according to the target reverberation effect parameter, the 7.1-channel data to obtain reverberation 7.1-channel sound data.

It is to be noted that, the electronic device described in the implementations of the disclosure are presented in the form of functional units. The term "unit" used herein should be understood as the broadest meaning as possible. An object for implementing functions defined by various units may be, for example, an application-specific integrated circuit (ASIC), a single circuit, a processor (shared, dedicated, or chipset) and a memory for executing one or more software or firmware programs, a combinational logic circuit, and/or other suitable assemblies that can achieve the above described functions.

The first obtaining unit 701, the second obtaining unit 702, the determining unit 703, the adjusting unit 704, the synthesizing unit 705, and the third obtaining unit 706 may be a control circuit or a processor.

According to the implementations of the disclosure, a computer storage medium is further provided. The computer storage medium is configured to store computer programs for electronic data interchange. The computer programs are operable with a computer to execute some of or all operations of any of the methods for processing the 3D audio effect described in the foregoing method implementations.

According to implementations of the present disclosure, a computer program product is further provided. The computer program product includes a non-transitory computer readable storage medium configured to store computer programs. The computer programs are operable with a computer to execute some of or all operations of any of the methods for processing the 3D audio effect described in the foregoing method implementations.

It is to be noted that, for the sake of simplicity, the foregoing method implementations are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the implementations described in the specification are exemplary implementations, and the actions and modules involved are not necessarily essential to the present disclosure.

In the foregoing implementations, the description of each implementation has its own emphasis. For parts not described in detail in one implementation, reference may be made to related descriptions in other implementations.

In the implementations of the present disclosure, the device disclosed in the implementations provided herein may be implemented in other manners. For example, the device/apparatus implementations described above are merely illustrative; for instance, the unit division is only a logical function division and there can be other division manners during actual implementations. For example, multiple units or assemblies may be combined or may be integrated into another system, or some features may be ignored or not performed. In addition, coupling, direct coupling, or communication connection between each illustrated or discussed component may be indirect coupling or communication among devices or units via some interfaces, and may be electrical connection, or other forms of connection.

The units described as separate components may or may not be physically separated. The components illustrated as units may or may not be physical units, that is, they may be in the same place or may be distributed to multiple network units. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions operable with a computer device (which may be a personal computer, a server, a network device, or the like) to execute all or part of the operations described in the various implementations of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the operations of the various methods of the implementations described above may be accomplished by means of a program to instruct associated hardware. The program may be stored in a computer-readable memory, which may include a flash memory, a ROM, a RAM, a magnetic disk, or a CD, and so on.

The foregoing illustrates the implementations of the present disclosure in detail. The principle and implementations of the present disclosure are illustrated by specific examples. The illustration of the above implementations are merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method for processing a three dimensions (3D) audio effect, comprising:
   obtaining, in a virtual reality (VR) scenario, eight first positions of eight monaural sound sources and eight pieces of monaural data corresponding to the eight monaural sound sources, the eight monaural sound sources corresponding to a target object, the eight monaural sound sources being in a one-to-one correspondence relation with the eight pieces of monaural data, and each of the eight monaural sound sources locating at a position with unique 3D coordinates;
   obtaining a second position of the target object in the VR scenario, the second position having 3D coordinates, and the eight first positions and the second position being based on same coordinate origin;
   determining a distance between each of the eight first positions and the second position to obtain eight distances;
   adjusting the eight pieces of monaural data according to the eight distances; and
   synthesizing the eight pieces of monaural data adjusted to 7.1-channel data;
   wherein adjusting the eight pieces of monaural data according to the eight distances comprises:
      selecting, from the eight distances, at least one distance smaller than a preset threshold to obtain at least one target distance;
      determining at least one piece of monaural data corresponding to the at least one target distance as a first monaural-data set;
      determining, among the eight pieces of monaural data, at least one piece of monaural data that fails to be contained in the first monaural-data set as a second monaural-data set;
      performing a first processing on the first monaural-data set to obtain a first target monaural-data set; and
      performing a second processing on the second monaural-data set to obtain a second target monaural-data set.

2. The method of claim 1, wherein the preset threshold is selected from the following: an average value of the eight distances, a minimum value among the eight distances, and a second minimum value among the eight distances.

3. The method of claim 1, wherein performing the first processing on the first monaural-data set to obtain the first target monaural-data set comprises:
   performing an audio effect enhancement processing on each piece of monaural data in the first monaural-data set to obtain the first target monaural-data set; and
   performing the second processing on the second monaural-data set to obtain the second target monaural-data set comprises:
      performing an audio effect reduction processing on at least one piece of monaural data in the second monaural-data set to obtain the second target monaural-data set.

4. The method of claim 3, wherein performing the audio effect reduction processing on the at least one piece of monaural data in the second monaural-data set comprises:
   obtaining at least one distance, wherein each of the at least one distance corresponds to one piece of monaural data in the second monaural-data set;
   determining, according to a predetermined mapping relation between distances and audio effect reduction coefficients, at least one target audio effect reduction coefficient corresponding to the at least one distance; and
   performing, according to the at least one target audio effect reduction coefficient, the audio effect reduction processing on the second monaural-data set.

5. The method of claim 1, wherein performing the first processing on the first monaural-data set to obtain the first target monaural-data set comprises:
   performing an audio effect maintaining processing on at least one piece of monaural data in the first monaural-data set to obtain the first target monaural-data set; and
   performing the second processing on the second monaural-data set to obtain the second target monaural-data set comprises:
      performing an audio effect reduction processing on at least one piece of monaural data in the second monaural-data set to obtain the second target monaural-data set.

6. The method of claim 1, wherein determining the distance between each of the eight first positions and the second position comprises:
   obtaining a first pixel position corresponding to a first position i, wherein the first position i is one of the eight first positions;
   obtaining a second pixel position corresponding to the second position;
   determining a target pixel difference between the first pixel position and the second pixel position; and
   determining, according to a predetermined mapping relation between distances and pixel differences, a target distance corresponding to the target pixel difference, wherein the target distance is a distance between the first position i and the second position.

7. The method of claim 1, wherein determining the second position of the target object in the VR scenario comprises:
   obtaining a map corresponding to the VR scenario; and
   determining a coordinate position of the target object in the map to obtain the second position.

8. The method of claim 1, further comprising:
   obtaining a target wallpaper corresponding to current environment;
   determining, according to a predetermined mapping relation between wallpapers and reverberation effect parameters, a target reverberation effect parameter corresponding to the target wallpaper; and
   processing, according to the target reverberation effect parameter, the 7.1-channel data to obtain reverberation 7.1-channel data.

9. An electronic device comprising:
   a processor; and
   a memory, configured to store one or more programs;
   the one or more programs, when executed, being operable with the processor to:
      obtain, in a virtual reality (VR) scenario, eight first positions of eight monaural sound sources and eight pieces of monaural data corresponding to the eight monaural sound sources, the eight monaural sound sources corresponding to a target object, the eight monaural sound sources being in a one-to-one correspondence relation with the eight pieces of monaural data, and each of the eight monaural sound sources locating at a position with unique 3D coordinates;

obtain a second position of the target object in the VR scenario, the second position having 3D coordinates, and the eight first positions and the second position being based on same coordinate origin;

determine a distance between each of the eight first positions and the second position to obtain eight distances;

adjust the eight pieces of monaural data according to the eight distances; and synthesize the eight pieces of monaural data adjusted to 7.1-channel data;

wherein the one or more programs operable with the processor to adjust the eight pieces of monaural data according to the eight distances are operable with the processor to:

select, from the eight distances, at least one distance smaller than a preset threshold to obtain at least one target distance;

determine at least one piece of monaural data corresponding to the at least one target distance as a first monaural-data set;

determine, among the eight pieces of monaural data, at least one piece of monaural data that fails to be contained in the first monaural-data set as a second monaural-data set;

perform a first processing on the first monaural-data set to obtain a first target monaural-data set; and perform a second processing on the second monaural-data set to obtain a second target monaural-data set.

10. The electronic device of claim 9, wherein the preset threshold is selected from the following: an average value of the eight distances, a minimum value among the eight distances, and a second minimum value among the eight distances.

11. The electronic device of claim 9, wherein the one or more programs operable with the processor to perform the first processing on the first monaural-data set to obtain the first target monaural-data set are operable with the processor to:

perform an audio effect enhancement processing on each piece of monaural data in the first monaural-data set to obtain the first target monaural-data set; and the one or more programs operable with the processor to perform the second processing on the second monaural-data set to obtain the second target monaural-data set are operable with the processor to:

perform an audio effect reduction processing on at least one piece of monaural data in the second monaural-data set to obtain the second target monaural-data set.

12. The electronic device of claim 11, wherein the one or more programs operable with the processor to perform the audio effect reduction processing on the at least one piece of monaural data in the second monaural-data set are operable with the processor to:

obtain at least one distance, wherein each of the at least one distance corresponds to one piece of monaural data in the second monaural-data set;

determine, according to a predetermined mapping relation between distances and audio effect reduction coefficients, at least one target audio effect reduction coefficient corresponding to the at least one distance; and perform, according to the at least one target audio effect reduction coefficient, the audio effect reduction processing on the second monaural-data set.

13. The electronic device of claim 9, wherein the one or more programs operable with the processor to perform the first processing on the first monaural-data set to obtain the first target monaural-data set are operable with the processor to:

perform an audio effect maintaining processing on at least one piece of monaural data in the first monaural-data set to obtain the first target monaural-data set; and the one or more programs operable with the processor to perform the second processing on the second monaural-data set to obtain the second target monaural-data set are operable with the processor to:

perform an audio effect reduction processing on at least one piece of monaural data in the second monaural-data set to obtain the second target monaural-data set.

14. The electronic device of claim 9, wherein the one or more programs operable with the processor to determine the distance between each of the eight first positions and the second position are operable with the processor to:

obtain a first pixel position corresponding to a first position i, wherein the first position i is one of the eight first positions;

obtain a second pixel position corresponding to the second position;

determine a target pixel difference between the first pixel position and the second pixel position; and determine, according to a predetermined mapping relation between distances and pixel differences, a target distance corresponding to the target pixel difference, wherein the target distance is a distance between the first position i and the second position.

15. The electronic device of claim 9, wherein the one or more programs operable with the processor to determine the second position of the target object in the VR scenario are operable with the processor to:

obtain a map corresponding to the VR scenario; and determine a coordinate position of the target object in the map to obtain the second position.

16. The electronic device of claim 9, wherein the one or more programs are further operable with the processor to:

obtain a target wallpaper corresponding to current environment;

determine, according to a predetermined mapping relation between wallpapers and reverberation effect parameters, a target reverberation effect parameter corresponding to the target wallpaper; and process, according to the target reverberation effect parameter, the 7.1-channel data to obtain reverberation 7.1-channel data.

17. A non-transitory computer readable storage medium, being configured to store one or more computer programs; the one or more computer programs, when executed, being operable with a processor to:

obtain, in a virtual reality (VR) scenario, eight first positions of eight monaural sound sources and eight pieces of monaural data corresponding to the eight monaural sound sources, the eight monaural sound sources corresponding to a target object, the eight monaural sound sources being in a one-to-one correspondence relation with the eight pieces of monaural data, and each of the eight monaural sound sources locating at a position with unique 3D coordinates;

obtain a second position of the target object in the VR scenario, the second position having 3D coordinates, and the eight first positions and the second position being based on same coordinate origin;

determine a distance between each of the eight first positions and the second position to obtain eight distances;

adjust the eight pieces of monaural data according to the eight distances; and synthesize the eight pieces of monaural data adjusted to 7.1-channel data;

wherein the one or more programs operable with the processor to determine the distance between each of the eight first positions and the second position are operable with the processor to:

obtain a first pixel position corresponding to a first position i, wherein the first position i is one of the eight first positions;

obtain a second pixel position corresponding to the second position;

determine a target pixel difference between the first pixel position and the second pixel position; and determine, according to a predetermined mapping relation between distances and pixel differences, a target distance corresponding to the target pixel difference, wherein the target distance is a distance between the first position i and the second position.

18. The non-transitory computer readable storage medium of claim 17, wherein the one or more programs operable with the processor to adjust the eight pieces of monaural data according to the eight distances are operable with the processor to:

select, from the eight distances, at least one distance smaller than a preset threshold to obtain at least one target distance;

determine at least one piece of monaural data corresponding to the at least one target distance as a first monaural-data set;

determine, among the eight pieces of monaural data, at least one piece of monaural data that fails to be contained in the first monaural-data set as a second monaural-data set;

perform a first processing on the first monaural-data set to obtain a first target monaural-data set; and perform a second processing on the second monaural-data set to obtain a second target monaural-data set.

* * * * *